June 18, 1963  D. V. FRYDENBERG  3,094,318
TABLE FENCE CLAMP

Filed April 27, 1960  2 Sheets-Sheet 1

INVENTOR.
DONALD V. FRYDENBERG
BY *Wm. T. Wofford*
*Attorney*

June 18, 1963  D. V. FRYDENBERG  3,094,318
TABLE FENCE CLAMP
Filed April 27, 1960  2 Sheets-Sheet 2
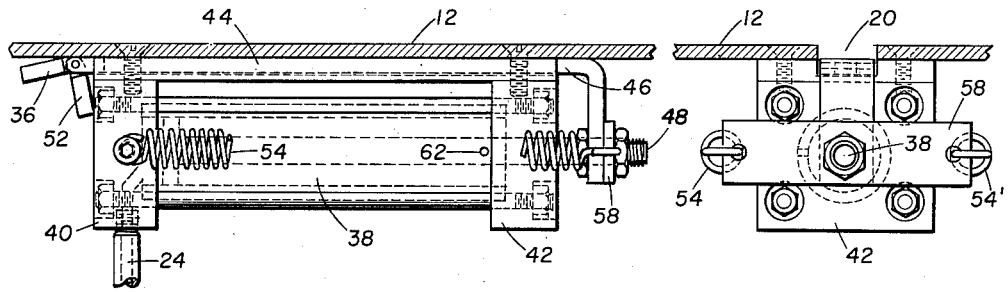
*Fig. 4*  *Fig. 5*
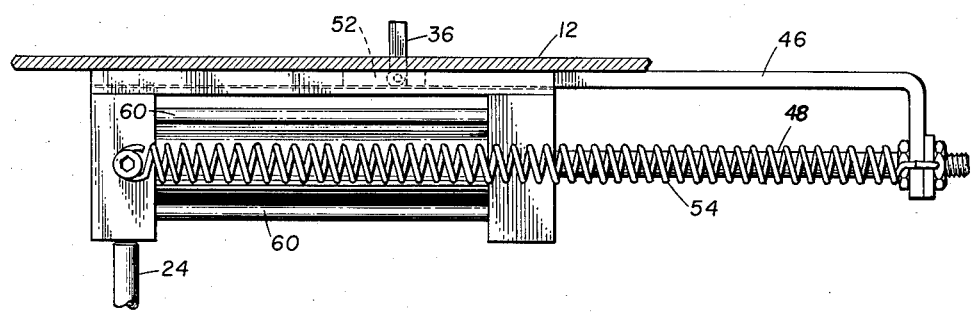
*Fig. 6*
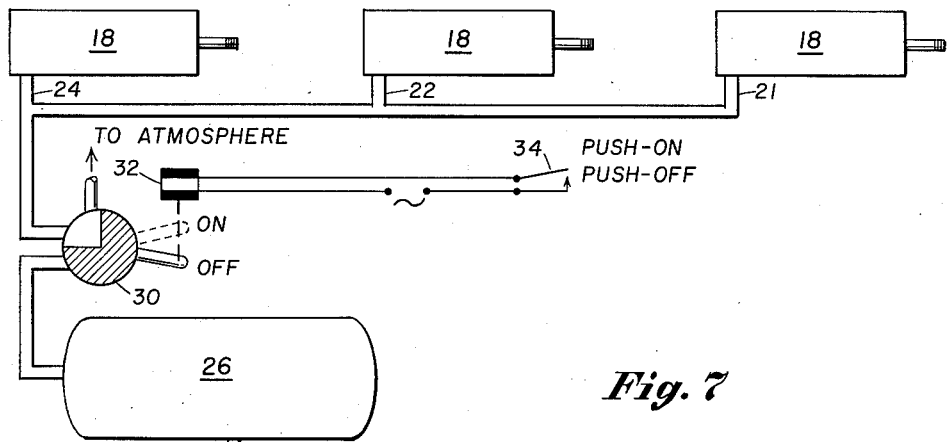
*Fig. 7*
INVENTOR.
DONALD V. FRYDENBERG
BY
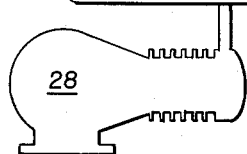
Attorney United States Patent Office 3,094,318
Patented June 18, 1963

3,094,318
TABLE FENCE CLAMP
Donald V. Frydenberg, Arlington, Tex., assignor, by mesne assignments, to Turn-A-Bore Equipment Co., Fort Worth, Tex., a corporation of Texas
Filed Apr. 27, 1960, Ser. No. 25,056
6 Claims. (Cl. 269—139)

This invention pertains to workpiece clamping or holding equipment, especially as used in clamping a workpiece firmly on the table of a woodworking machine, machine tool or the like.

It is a principal object of the invention to provide clamping equipment of this type which, when in its released condition, will leave the top surface of the work table completely free of all projections or other obstructions that would interfere with its use for normal support, loading or assembly operations.

A further object of the invention is to provide equipment of the foregoing type in which one or more work clamping units are mounted beneath a table top for moving and clamping a workpiece against an abutment or fence thereof, said units each including a movable pusher dog, toggle or the like which automatically drops beneath the table surface when the clamp is released, to leave the table unobstructed for loading, unloading or other operations and uses.

Yet another object of the invention is to provide a work table fence clamp whose clamping dog is subject to a compound motion including an initial phase in which the dog is projected upward from beneath the top surface of the table and into a table slot directed toward the table fence, and a following phase in which the dog is bodily moved along said slot to engage, push and clampingly hold a workpiece against the fence; the reverse motions freeing the workpiece and allowing the dog to retract beneath the table to a non-obstructing position of rest.

A further object of the invention is to provide a table fence clamp arrangement as described above in which the clamping unit (or units) can be power-operated in a very simple manner by a single-stroke mechanism such as a pneumatic cylinder or the like, to accomplish the compound motion described above. This permits a simple form of individual or ganged remote control of the clamps from a convenient central location.

An additional object of the invention is to provide a clamp of the kind generally indicated above, in which the projection and retraction of the clamp dog is accomplished purely by reason of the geometrical relationship of the parts, so that a very simple and reliable construction, without complicated auxiliary interlocks and the like, is obtained.

In essence, the invention provides a work table having a fixed or adjustable fence defining one clamp element, said table being slotted in a direction perpendicular to the fence to accommodate a bodily-movable work-engaging dog which constitutes the opposing clamp element. The dog itself is arranged to drop completely below the table surface when it is at the idle end of the slot (that is, the end remote from the fence), but is automatically projected at least partly above that surface at the commencement of its clamping motion.

With the foregoing objects and principles in mind, the invention will best be understood from the following detailed description of a preferred embodiment, given by way of illustrative example, and taken in connection with the appended drawings, in which:

FIGURE 4 is a side elevation of the unit of FIGURE 3, shown mounted beneath a portion of the table top, and with the clamp dog retracted in its table-clearing position.

FIGURE 5 is an end elevation of FIGURE 4.

FIGURE 6 is a view similar to FIGURE 4 but showing the clamp operated, with its clamp dog extending above the table top in position to engage a workpiece.

FIGURE 7 is a schematic diagram of a typical pneumatic control and operating system for the three-clamp installation of FIGURE 1.

Figure 1:
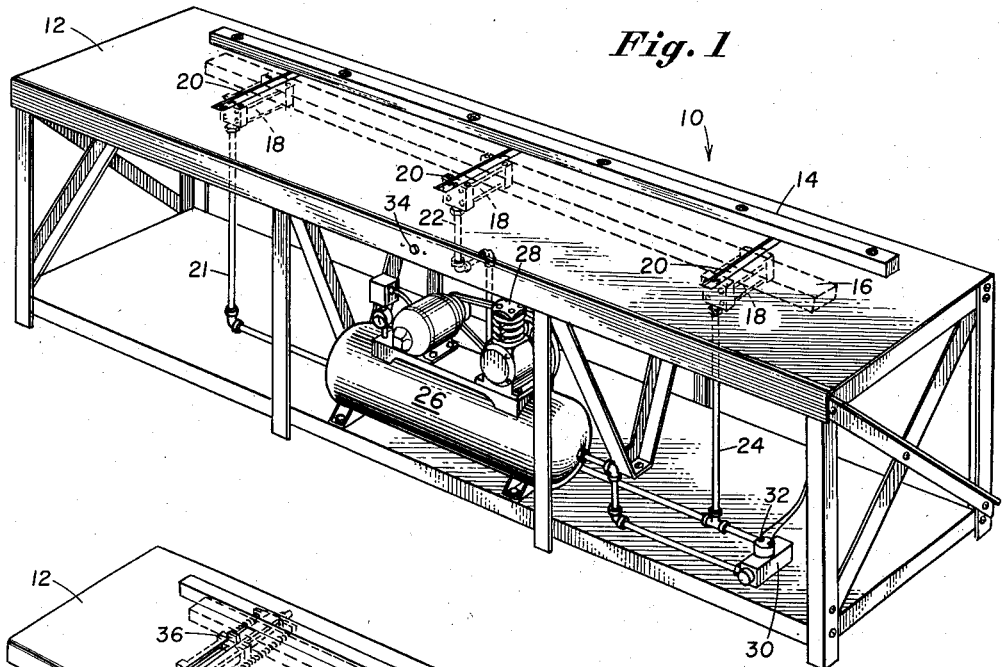
FIGURE 1 is a perspective view of a complete work table incorporating a set of three cooperating clamp systems in accordance with the invention, the workpiece being shown in dotted lines in an unclamped position.

Referring first to FIGURE 1 of the drawings, there is shown a typical form of work table designated as a whole by reference number 10, and having a plane metal or other rigid top 12 to which is secured a workpiece position-defining fence 14. Fence 14 is here shown as bolted to the table top, but it will be understood that it can equally well be arranged to be secured thereto in an adjusted position by the use of devices common in the arts. Moreover, table 10 will generally be a part of a wood or metal-working machine such as a power saw, milling machine, drill or the like, but such material-working instrumentalities have been omitted from the drawings since they form no essential part of the invention.

A workpiece 16 is indicated as lying upon table top 12, and it is desired to position and firmly clamp the same against fence 14 in preparation for other operations. To this end, the invention provides a set, three being shown in this instance, of clamping units 18 located beneath corresponding slots 20 in table top 12. Each unit 18 is connected as by conduits 21, 22, 24 to the supply tank 26 of an air compressor 28, preferably electrically powered and with an automatic pressure-responsive switch to maintain a proper gauge pressure. The conduits supplying pressure air to units 18 are controlled in unison as by a common four-way valve 30 in turn controlled by an on-off solenoid 32 from a pushbutton station 34.

Figure 2:
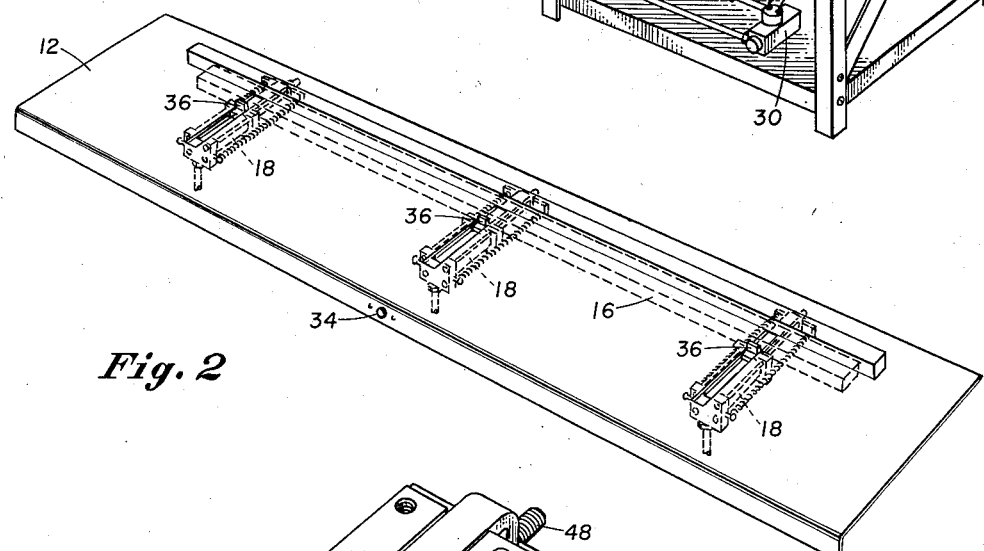
FIGURE 2 is a similar view of the table top only, and with the clamps operated to secure the workpiece against the table fence.

When conduit valve 30 is opened to apply tank pressure to units 18, the latter operate first to project their clamping dogs 36 up through the slots 20 at the ends of the latter remote from fence 14, and then to move the thus-elevated dogs toward the fence, ultimately shoving and clamping workpiece 16 thereagainst, as shown in FIGURE 2. When valve 30 is closed, the air supply to units 18 is cut off and they are vented to atmosphere, whereupon the clamping dogs 36 are moved away from the workpiece 16 (preferably by spring action), and finally drop beneath table top 12 to leave the latter wholly unobstructed.

Figure 3:
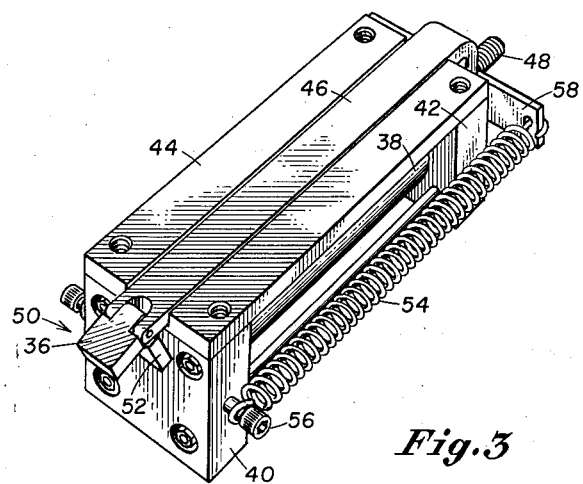
FIG. 3 is a perspective view of one of the clamping units itself.

The way in which clamping units 18 operate in conjunction with table top 12 will best be understood by referring now to FIGURES 3 to 6 of the drawings. Basically, each unit as shown in FIGURE 3 includes a pneumatic cylinder 38 held in a unit framework including end blocks 40, 42 connected by a shoe plate 44 which is longitudinally rabbeted or grooved to receive a sliding bar 46, whose vertical thickness may be a little less than the groove depth so as to slide freely beneath the table top when the upper surface of plate 44 is bolted or otherwise secured against the under side of the table top 12. Alternatively, and as shown herein, the width of bar 46 may be a little less than that of table slots 20, providing ample clearance for such motion. In any event, the length of the table slot 20 is sufficient to provide clear space at the end of unit 18 to accommodate the retracted dog.

One end of bar 46 is turned down and connected rigidly to the end extension 48 of the piston rod protruding from cylinder 38. At its nearer end (in FIGURE 3), bar 46 carries the pivoted two-armed dog or toggle element 50 whose dog arm 36 can thus swing up into and through a table slot 20 whenever its tailpiece arm 52 encounters end block 40 or the edge of plate 44 at the commencement of motion of the slide bar 46. At least one restoring spring 54 is connected at one end to block 40 (as at bolt 56) and at the other to a lug plate 58 connected to the downturned end of bar 46 or piston rod 48, so that when the cylinder 38 is vented to atmosphere the piston will retract, as will dog element 50, dog arm 36 finally dropping again into the table-free position of FIGURE 3. Dog 50 is designed so that its tailpiece arm 52 is sufficiently heavy, and the pivot sufficiently loose, that the dog falls freely out of its upper position when bar 46 is retracted to its release position as in FIGURE 1.

FIGURES 4 and 5 show the above parts in side elevation and in an end view looking at the lug plate 58. As shown in the latter figure, two springs 54 and 54' are preferably provided, on opposite sides of the unit, to balance the restoring force on the piston and prevent any chance of binding.

FIGURE 6 shows the same configuration as FIGURE 4, but with the piston and slide 46 partly extended, and dog arm 36 thus tilted up to extend above table top 12. Auxiliary frame rods as at 60 may connect end blocks 40 and 42 for greater rigidity.

In the single-acting spring-return piston and cylinder actuator shown, a vent 62 ahead of the piston is provided to allow the piston to move freely (or at a limited speed) in its two directions of motion. A double-acting system can obviously be employed at the cost of extra complication.

The control system is outlined in the schematic diagram of FIGURE 7, in which parts bear the reference numerals assigned above. The push-button control 34 may be of the sequential push-on, push-off type or of other characteristics as desired, and control from any of several such stations, conveniently located, is readily achieved by adding additional such switches. Solenoid-controlled valve 30 is preferably of the conventional four-way type to vent the cylinders to atmosphere when the valve is closed to cut off pressure supply to the cylinders, and the exhaust port of the valve may be restricted to prevent units 18 from slamming too violently to their retracted positions. Moreover, while electro-pneumatic control is illustrated herein for convenience and by preference, hydraulic, electro-hydraulic or even straight power-solenoid operation can be substituted without change in the automatic retracting-dog feature of the combination.

Variants such as those mentioned, and other changes of a nature obvious to persons skilled in mechanics, can readily be accomplished without departing from the true spirit of the invention as defined in the appended claims.

What is claimed is:

1. In combination, a work table, a fence stationed upon said work table, a clamping device for holding a workpiece securely against said fence, said work table having at least one slot directed towards said fence, said clamping device comprising a member mounted for sliding reciprocable movement beneath said slot for motion toward and away from said fence, a clamp dog mounted on said member for pivotal movement into and through said slot between a retracted position leaving said table surface clear and an extended position projecting above said table; means for moving said member in a clamping stroke toward said fence, and means comprising an abutment positioned beneath said table and extending at least the length of said clamping stroke for engagement by said clamp dog for automatically pivoting said clamp dog into its extended position during an initial part of such motion of said member, and for holding said clamp dog in its extended position throughout the remainder of the clamping stroke of said member.

2. A clamping device in accordance with claim 1, in which said clamp dog is formed as a double-armed pivoted lever having one leg adapted to be projected into and through said slot in response to rotation of the other arm.

3. A slotted work table, a clamping unit for use in combination with said table, said clamping unit comprising a support providing a sole plate adapted for attachment to the under side of said table beneath a slot therein, a slide bar mounted on said sole plate for reciprocable movement in a rectilinear path parallel to the slot direction, a clamp dog pivotally mounted on said slide bar for movement between positions wholly below said table and extending at least in part upwardly through the slot and above the table, and cooperating formations on said sole plate and said clamp dog for pivoting the latter into its upwardly extending position upon rectilinear movement of said slide bar relative to said sole plate.

4. A clamping unit in accordance with claim 3, including power-operated drive means on said unit for moving said slide bar.

5. A clamping unit in accordance with claim 3, in which said clamp dog comprises an L-shaped lever having one arm adapted to swing between positions above and below the upper surface of said slide bar, and the other arm positioned for engagement with said sole plate to raise the first arm in response to rectilinear motion of said slide bar on said sole plate.

6. A clamping unit comprising a plate member, a channel in said plate member, a slider bar in said channel and having an end portion normally extending outwardly beyond said channel, an angle member having a pair of legs, means pivoting said angle member at the juncture of said legs to the end portion of said slider bar about an axis transverse to said slider bar so that said legs normally rest beneath the level of the slider bar upper surface, and means powering said slider bar to an actuated position wherein said end portion is within said channel, whereby one of said legs will cooperate with said channel to force the other said leg to a position extending above the upper surface of said slider bar.

References Cited in the file of this patent

UNITED STATES PATENTS

| | | |
|---|---|---|
| 1,185,852 | Solis | June 6, 1916 |
| 1,736,171 | Powell | Nov. 19, 1929 |
| 1,838,780 | Miller et al. | Dec. 29, 1931 |
| 2,560,843 | Brosemer | July 17, 1951 |

FOREIGN PATENTS

| | | |
|---|---|---|
| 176,225 | Austria | Sept. 25, 1953 |
| 200,782 | Austria | Nov. 25, 1958 |